United States Patent
Hurst et al.

(10) Patent No.: US 7,263,068 B2
(45) Date of Patent: Aug. 28, 2007

(54) METHOD AND APPARATUS FOR DETERMINING A PROTOCOL USED ON A SIGNALLING LINK

(75) Inventors: Michael Hurst, Edinburgh (GB); Kate Patterson, Edinburgh (GB); Craig Renfrew, Stirling (GB)

(73) Assignee: Agilent Technologies, Inc., Santa Clara, CA (US)

( * ) Notice: Subject to any disclaimer, the term of this patent is extended or adjusted under 35 U.S.C. 154(b) by 843 days.

(21) Appl. No.: 10/625,128

(22) Filed: Jul. 23, 2003

(65) Prior Publication Data

US 2004/0125752 A1 Jul. 1, 2004

(30) Foreign Application Priority Data

Aug. 19, 2002 (EP) .................................. 02255764

(51) Int. Cl.
G06F 11/00 (2006.01)
H04B 17/00 (2006.01)
H04L 12/26 (2006.01)

(52) U.S. Cl. ...................... 370/244; 370/252; 370/469; 455/67.11

(58) Field of Classification Search ........ 370/241–253, 370/522–524, 469; 455/67.11, 423, 424; 714/39, 47
See application file for complete search history.

(56) References Cited

U.S. PATENT DOCUMENTS 6,091,950 A  7/2000  Remy .......................... 455/423

FOREIGN PATENT DOCUMENTS

| EP | 0 738 091 | | 10/1996 |
|---|---|---|---|
| EP | 0738091 | * | 10/1996 |
| EP | 0 851 700 | | 7/1998 |
| EP | 0851700 A1 | * | 7/1998 |
| EP | 0 920 228 | | 6/1999 |
| EP | 1 041 830 | | 10/2000 |
| FR | 2 813 156 | | 8/2000 |

OTHER PUBLICATIONS

Todorut, C., European Search Report Application No. EP 02 25 5764 dated May 8, 2003.

* cited by examiner

Primary Examiner—Afsar Qureshi (57) ABSTRACT

Apparatus for determining a protocol of messages traversing a signalling link in a telecommunications network includes a memory for storing one or more predetermined characteristic of a message in the protocol that can be used to distinguish that protocol from other protocols. A protocol auto-discovery module is coupled to the memory and to a module that extracts channels from signalling link timeslots. The protocol auto-discovery module determines whether the predetermined characteristic is present in the sampled message and identifies the signalling link as carrying messages in the particular protocol if the predetermined characteristic is present in the sampled message. The identification may be based on a confidence measure stored in a channel configuration table which is incremented when a message on the signalling link is identified as being in that particular protocol and decremented when a message is identified as being in another protocol.

15 Claims, 5 Drawing Sheets

METHOD AND APPARATUS FOR DETERMINING A PROTOCOL USED ON A SIGNALLING LINK

TECHNICAL FIELD

This invention relates to a method and apparatus for determining a protocol used on a signalling link in a telecommunications system, and particularly though not exclusively for determining protocols on monitoring links of telecommunications systems, for example those conforming to the Global System for Mobile Communication (GSM) standard.

BACKGROUND ART

In modern switched telecommunications systems (in particular, modern Public Switched Telephone Networks (PSTNs) and Public Land Mobile Networks (PLMNs)) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network (sometimes known as out-of-band signalling). In practice, such signalling networks comprise high-speed computers interconnected by signalling links; computer programs control the computers to provide a set of operational and signalling functions in accordance with a standardised protocol.

One example of such a signalling protocol is the Signalling System No. 7 (SS7), whether as specified by the CCITT, ANSI, ETSI (for GSM), Bellcore or similar body, such a network being herein referred to as an SS7 network. As is known in connection with such networks, signalling information is passed over the signalling links to carry out particular a signalling conversation, or transaction.

Since there may be a number of different protocols carried on the network being monitored, the particular protocol of a transaction must be determined before the messages relating to that transaction can be decoded and analysed. This may be achieved by manual reconfiguration through static data defining the protocol running on each link, when it is known. However, where multiple links are involved (for example where a number of links are multiplexed together), this procedure is tedious and error-prone. Furthermore, any changes to the network require an additional manual step to reconfigure the monitoring system. Any delay between changes in the network and reconfiguration causes data loss, and may cause unexpected results.

SUMMARY OF INVENTION

According to one aspect of this invention there is provided a method for determining a protocol of messages traversing a signalling link in a telecommunications network, comprising the steps of predetermining at least one characteristic of a message in the protocol that can be used to distinguish that protocol from other protocols, monitoring at least one signalling link carrying messages between two nodes of the telecommunications network, determining whether the predetermined characteristic is present in the monitored message, and identifying the signalling link as carrying messages in the particular protocol if the predetermined characteristic is present in the monitored message.

A plurality of characteristics may be predetermined for each protocol to be distinguished. The monitored message may be analysed to determine whether different predetermined characteristics for distinguishing different protocols is/are present in the monitored message.

A plurality of messages on the signalling link may be analysed to determine whether one or more of the predetermined characteristics is/are present in the monitored messages.

In one embodiment, the method further comprises the step of storing a confidence measure providing an indication of the confidence of an identification of the signalling link as carrying messages in a particular protocol. The confidence measure may include a count of the number of messages on the signalling link that are identified as being in the particular protocol. The confidence measure may be incremented each time a message on the signalling link is identified as being in the particular protocol and decremented each time a message on the signalling link is identified as being in a different protocol. The method may further include the step of determining whether the confidence measure has reached a predetermined threshold level and identifying the signalling link as carrying messages in the particular protocol only if the confidence measure has reached the predetermined threshold level.

According to a second aspect, the invention provides an apparatus for determining a protocol of messages traversing a signalling link in a telecommunications network, comprising a memory for storing at least one predetermined characteristic of a message in the protocol that can be used to distinguish that protocol from other protocols, a monitoring means for monitoring at least one signalling link carrying messages between two nodes of the telecommunications network, and determination means coupled to the monitoring means and the memory for determining whether the predetermined characteristic is present in the monitored message and for identifying the signalling link as carrying messages in the particular protocol if the predetermined characteristic is present in the monitored message The determination means may determine whether a monitored message includes different predetermined characteristics for distinguishing different protocols and identify the signalling link as carrying messages in the particular protocol if the monitored message is determined as having the particular predetermined characteristic distinguishing that particular protocol.

In one embodiment, the apparatus further comprises a confidence measure indicator coupled to the determination means for indicating the confidence of an identification of the signalling link as carrying messages in a particular protocol.

The confidence measure indicator may be incremented each time a message on the signalling link is identified as being in the particular protocol and decremented each time a message on the signalling link is identified as being in a different protocol.

The determination means may check whether the confidence measure has reached a predetermined threshold level and identify the signalling link as carrying messages in the particular protocol only if the confidence measure indicator has reached the predetermined threshold level.

The protocol to be distinguished may include at least one of LAPD and MTP.

BRIEF DESCRIPTION OF DRAWINGS

One embodiment of the present invention, for determining a protocol of messages traversing a signalling link in a telecommunications network, will now be described, by way of example, with reference to the accompanying drawings, in which.

DETAILED DESCRIPTION OF THE DRAWINGS

Figure 1:
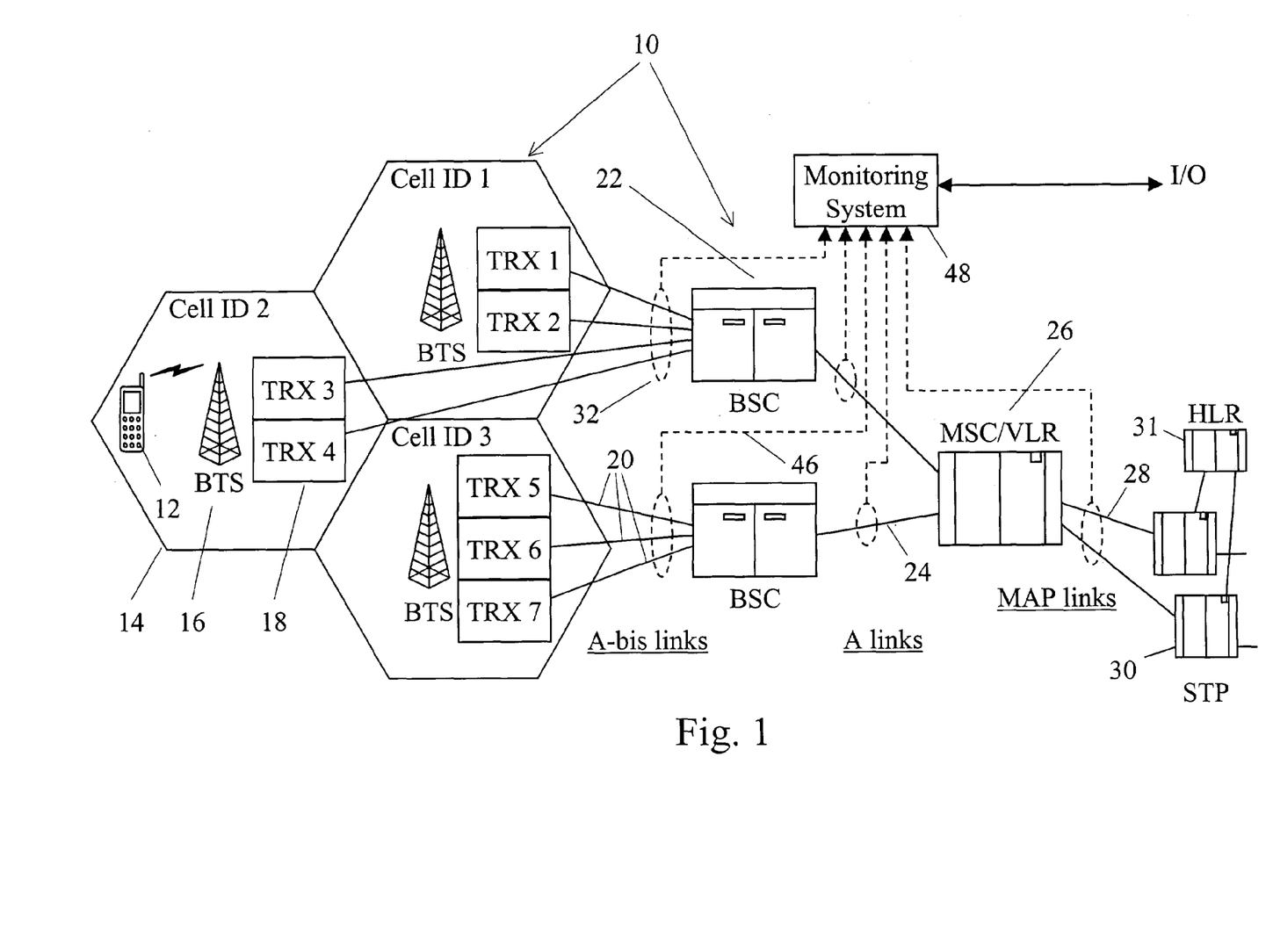
FIG. 1 is a schematic illustration of part of a mobile telephone network.

FIG. 1 shows major elements of a GSM cellular mobile telephone network 10, with additional equipment to facilitate monitoring of the network. For the sake of clarity the telecommunications transmission lines for carrying user voice and data signals are omitted; only the signalling links for control of operation of the network, which are of interest in the context of this invention, are shown.

Referring to FIG. 1, the coverage area of the network 10 is organised into location areas (only one of which is shown), each location area typically containing several cells 14, which are the basic unit of division of the coverage area for the purposes of radio spectrum management and are shown in FIG. 1 as conventional idealised hexagons. The cells 14 are grouped into location areas to facilitate routing of an incoming call to the handset 12. Each cell 14 contains a Base Station Transceiver (BTS) 16 which houses one or more radio transceivers (TRXs 1-7) 18 for communicating with Mobile Handsets (MSs) 12 over the radio "air interface", and these transceivers are connected via "A-bis" signalling links 20 to a Base Station Controller (BSC) 22 which may control transceivers in more than one BTS 16. The sub-system comprising a BSC 22 and its associated BTSs 16 is sometimes referred to as a base station system (BSS). The BSCs 22 are themselves co-ordinated via "A" signalling links 24 by Mobile Switching Centres (MSCs) 26, which may control BSCs 22 in more than one location area. The MSCs typically contain Visitor Location Registers (VLRs) for coordinating services to MSs 12, and have links 28 carrying Mobile Application Protocol (MAP) messages from the MSCs/VLRs 26 to Signal Transfer Points (STPs) 30 providing signalling connections to other parts of the network, and in particular to a Home Location Register (HLR) 31 for storing subscriber information.

In the present example of the invention, signalling data which can be used to determine the efficiency of operation of the network is obtained by equipment 48 for monitoring signalling messages traversing the A-bis links 20, the A links 24, and the MAP links 28. This signalling data is carried by different link level protocols, depending on which signal links the data is on. For example, signals on the A-bis links 20 are generally carried by Link Access Protocol—D channel (LAPD), whereas signals on the A links 24 and the MAP links 28 are carried by Message Transfer Part (MTP) protocol.

Figure 2:
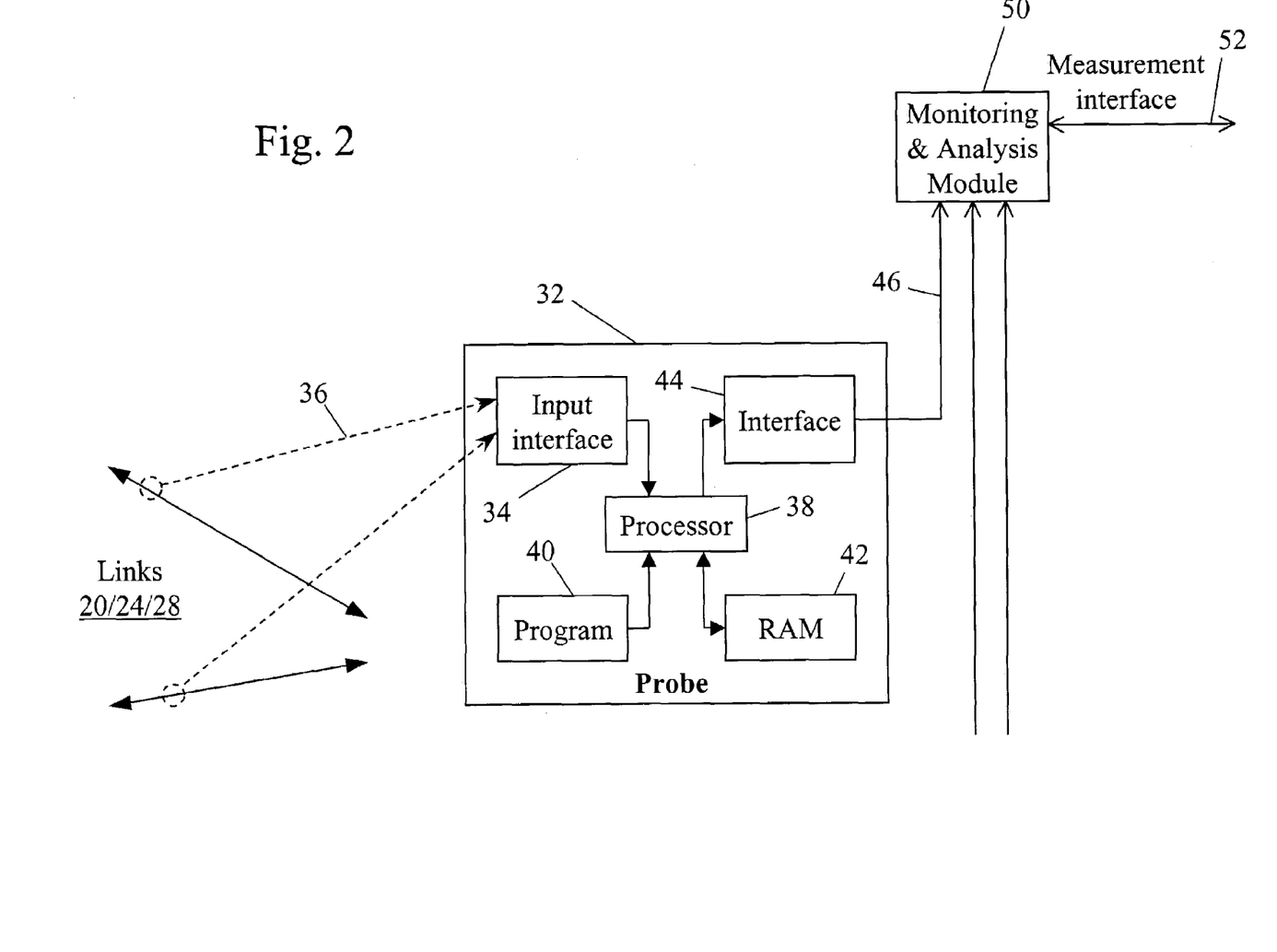
FIG. 2 is a block schematic diagram of a probe forming part of a monitoring system for monitoring the network of FIG. 1.

The monitoring equipment 48 includes a monitoring and analysis module 50 and a monitoring probe 32, as best seen in FIG. 2, for passively monitoring signalling messages traversing the A-bis, A links and the MAP links 20, 24 and 28, as described below. The monitoring is passive in the sense that the operation of the links 20, 24 and 28 is undisturbed by the presence of the monitoring system, which simply makes copies of some or all of the message packets it observes traversing the links. The probe 32 is coupled to the links in such a way that the operating characteristics of the links 20, 24 and 28 are not significantly altered. In the case of an optical link, for example, the coupling may comprise an optical power splitter and for an electrical link it may be a bridging isolator.

As shown in FIG. 2, the probe 32 has an input interface 34 which receives and conditions the signal received over a line 36 from the coupling to the relevant link 20, 24 or 28 and which supplies the signal to a processor/CPU 38 operating under the control of software program instructions in a program store 40 and using a random access store 42. The processor 38 extracts messages from the signal and performs some initial processing (e.g. error checking and preliminary decoding). The messages are subsequently forwarded via an interface 44 and a communications bus 46 to the monitoring and analysis module 50 for any necessary additional decoding and for further analysis as described below. This monitoring and analysis module provides a real-time measurement data stream on a measurement interface 52. The probe 32 may comprise, for example, components of an acceSS7 system equipment available from Agilent Technologies for monitoring messages traversing SS7 signalling networks.

Figure 3:
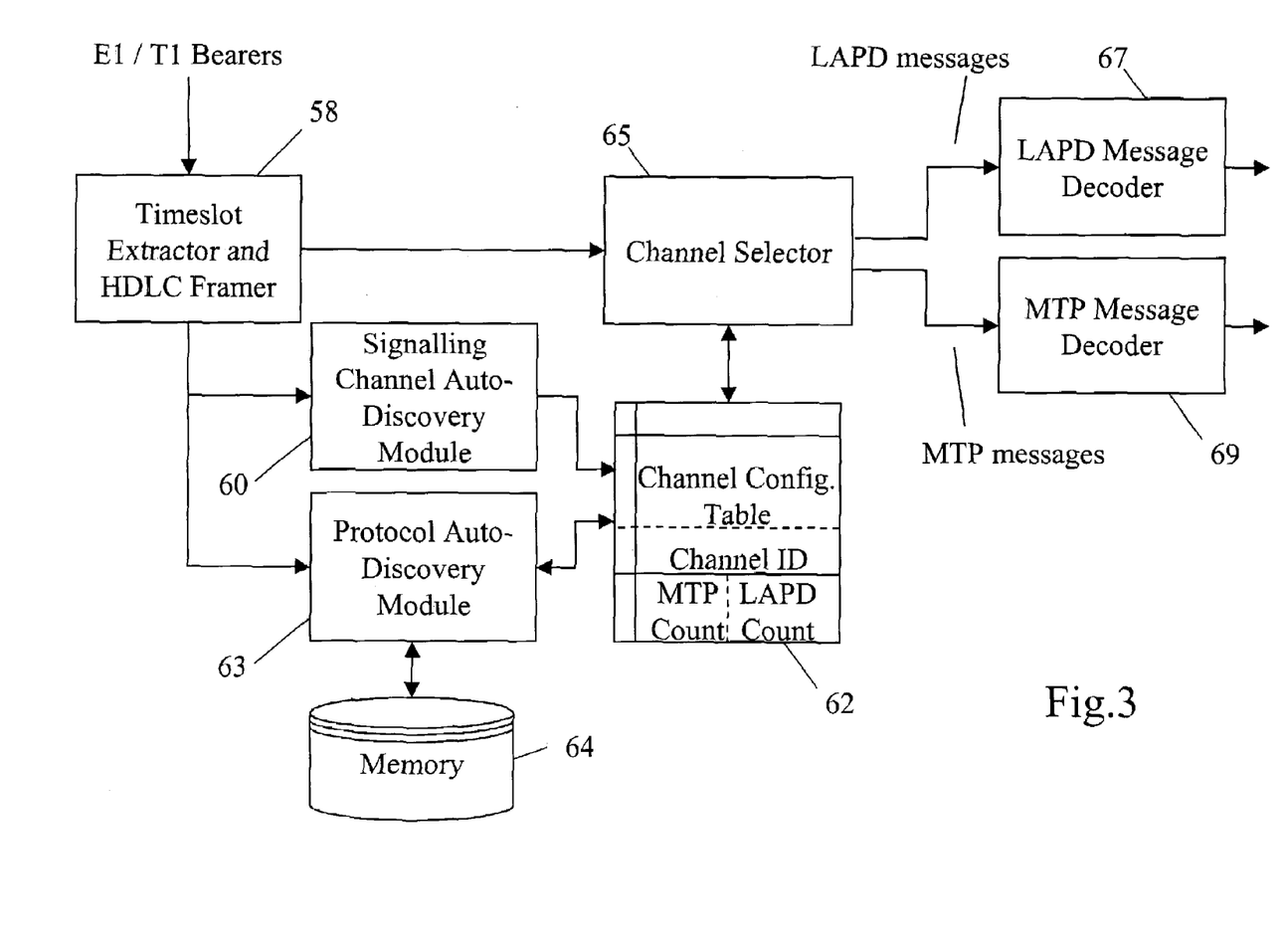
FIG. 3 is a schematic block diagram of part of the monitoring and analysis module of FIG. 3.

FIG. 3 shows part of the architecture of the probe 32 and the monitoring and analysis module 50 in terms of functional modules involved in the processing they perform. Referring to FIG. 3, the data streams carried on the A-bis, A and MAP links 20, 24 and 28 are received via for example E1 or T1 bearers (physical cables) connected to the probe(s) 32, and data timeslots in those data streams are identified and extracted in Timeslot Extractor and HDLC Framer module 58. Since all signalling is carried by High-Level Data Link Control (HDLC) frames, signalling channels (as opposed to channels carrying voice or data traffic) are found by looking for timeslots carrying HDLC frames. An HDLC frame is identified by a flag at the beginning of the frame. HDLC frames are passed, together with information regarding the timeslots they relate to, to a Signalling Channel Auto-Discovery Module 60 and to a Protocol Auto-Discovery Module 63, as will be described more fully below.

The Signalling Channel Auto-Discovery Module 60 scans through all sub-rates of all timeslots on all bearers looking for valid HDLC frames. A valid HDLC frame is identified by valid checksum at the end of the frame. When such a valid HDLC frame is found, an entry is made in a Channel Configuration Table 62, that is stored in suitable non-volatile memory, that the channel on that particular timeslot is likely to be signalling channel (since signalling channels use HDLC frames).

Once a signalling channel or link has been found on a particular timeslot in the signalling link, the protocol of the messages on that channel needs to be determined. This is carried out by the Protocol Auto-Discovery Module 63. The Protocol Auto-Discovery Module 63 receives the HDLC frames, together with information regarding the timeslots they relate to, from the Timeslot Extractor and HDLC Framer 58, as well as information from the Channel Configuration Table 62 indicating that a particular channel is likely to be a signalling channel. The Protocol Auto-Discovery Module 63 thus scans HDLC frames to try to determine which protocol is being carried by the particular channel. The Protocol Auto-Discovery Module 63 utilises predetermined characteristics of the protocols which have been stored in a memory 64. The predetermined characteristics depend on the particular protocol being searched for. It should be pointed out that, although in this implementation, only LAPD and MTP2 protocols are being positively identified, other protocols (for example new protocols) may be present, which would not be identified.

The Channel Configuration Table 62 generally includes a timeslot entry for each channel that has been determined by the Signalling Channel Auto-Discovery Module 60 to be likely to be a signalling channel and provides protocol identification of the particular channel (Channel ID) to a Channel Selector 65. The Channel Selector 65 receives the HDLC frames from the Timeslot Extractor and HDLC Framer module 58 and, if it finds that the channel has been positively identified by having a Channel ID stored in the Channel Configuration Table 62, the Channel Selector 65 passes the frames on that particular channel on to particular decoders 67, 69, according to the Channel ID, for further decoding and analysis. For example, as shown in FIG. 3, messages that are carried on a channel that has been identified as carrying the LAPD protocol are passed to the LAPD Message Decoder 67, whereas messages carried on a channel that has been identified as carrying the MTP protocol are passed to the MTP Message Decoder 69.

Figure 4:
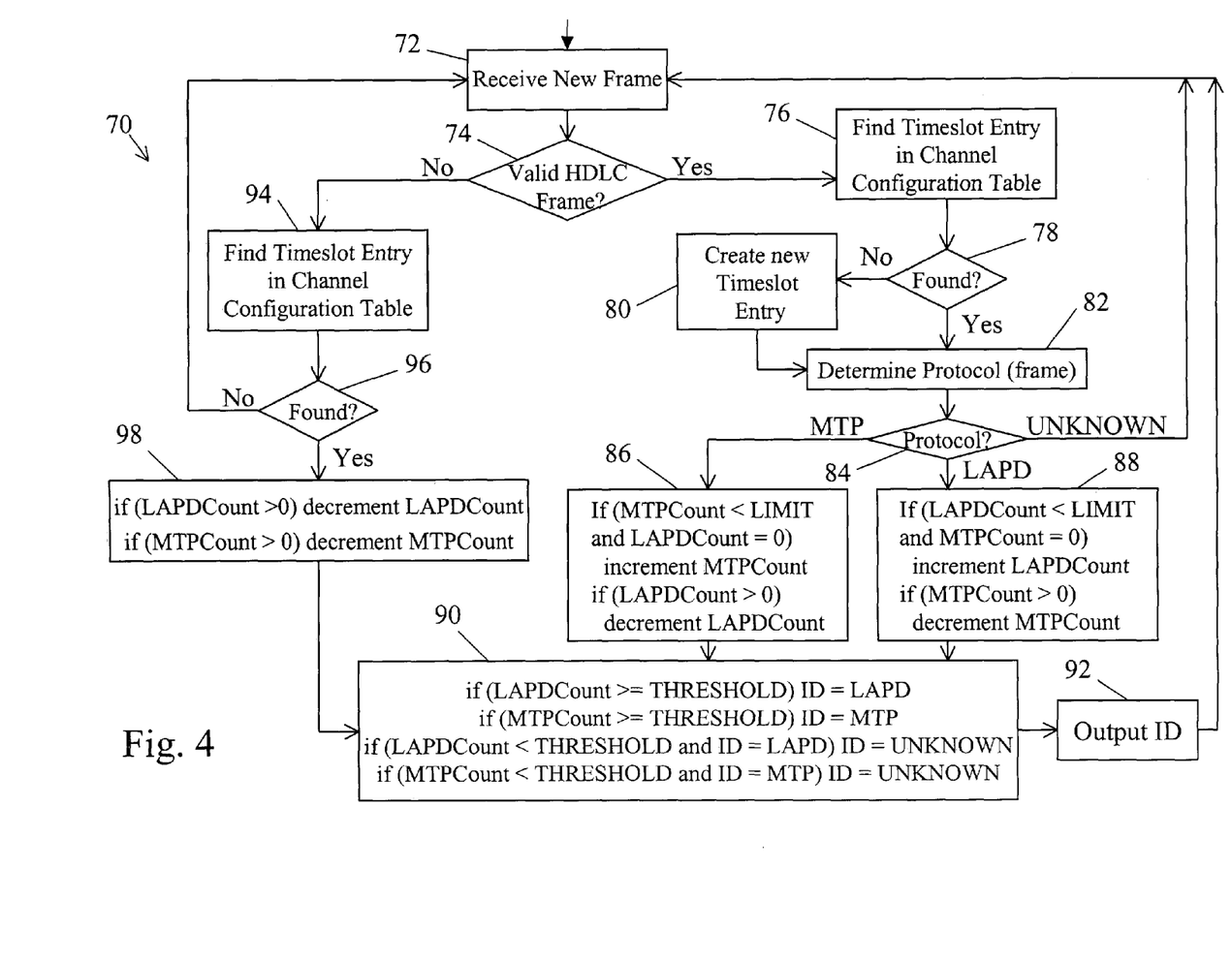
FIG. 4 is a schematic flow chart of the operation of the signalling channel auto-discovery module shown in FIG. 3.

Turning now to FIG. 4, there is shown a flowchart 70 of a method of operation of Protocol Auto-Discovery Module 63, in conjunction with memory 64 and Channel Configuration Table 62, for determining protocols. The characteristics used to identify the protocols depend, of course, on the particular protocol and may include several different characteristics in order to produce a positive identification. In this example, the protocols to be determined are LAPD and MTP and the particular characteristics used for determining these protocols are peculiar to them.

For example, in MTP, the bottom 6 bits of the 3rd octet constitutes the length field. The MTP protocol can contain filler signal units (FISUs) having a length of three Octets. Three Octet frames with this characteristic will never be present in LAPD protocol. Thus, if a frame with a length of three octets has a MTP length field of 0 then the frame is an MTP FISU. In an LAPD frame, the top six bits of the first octet constitutes the Service Access Point Indicator (SAPI). A SAPI having a valid value of LAPD_SAPI, which is a predefined characteristic equal to the SAPI of interest, indicates that the protocol is LAPD.

Thus, as shown in FIG. 4, when the Protocol Auto-Discovery Module 63 receives a new frame (step 72), it first checks (step 74) whether it is a valid HDLC frame by looking for a valid checksum at the end of the frame. If it is a valid HDLC frame, the Channel Configuration Table 62 is searched (step 76) to determine whether timeslot entry information for that frame has already been entered in the Channel Table 63 by the Signalling Channel Auto-Discovery Module 60. If a timeslot entry is found, then the protocol of the frame is determined by subroutine 82, as will more fully described below. If the timeslot entry is not found for that frame, then such a timeslot entry is created (step 80) and then the protocol of the frame is determined by subroutine 82.

Figure 5:
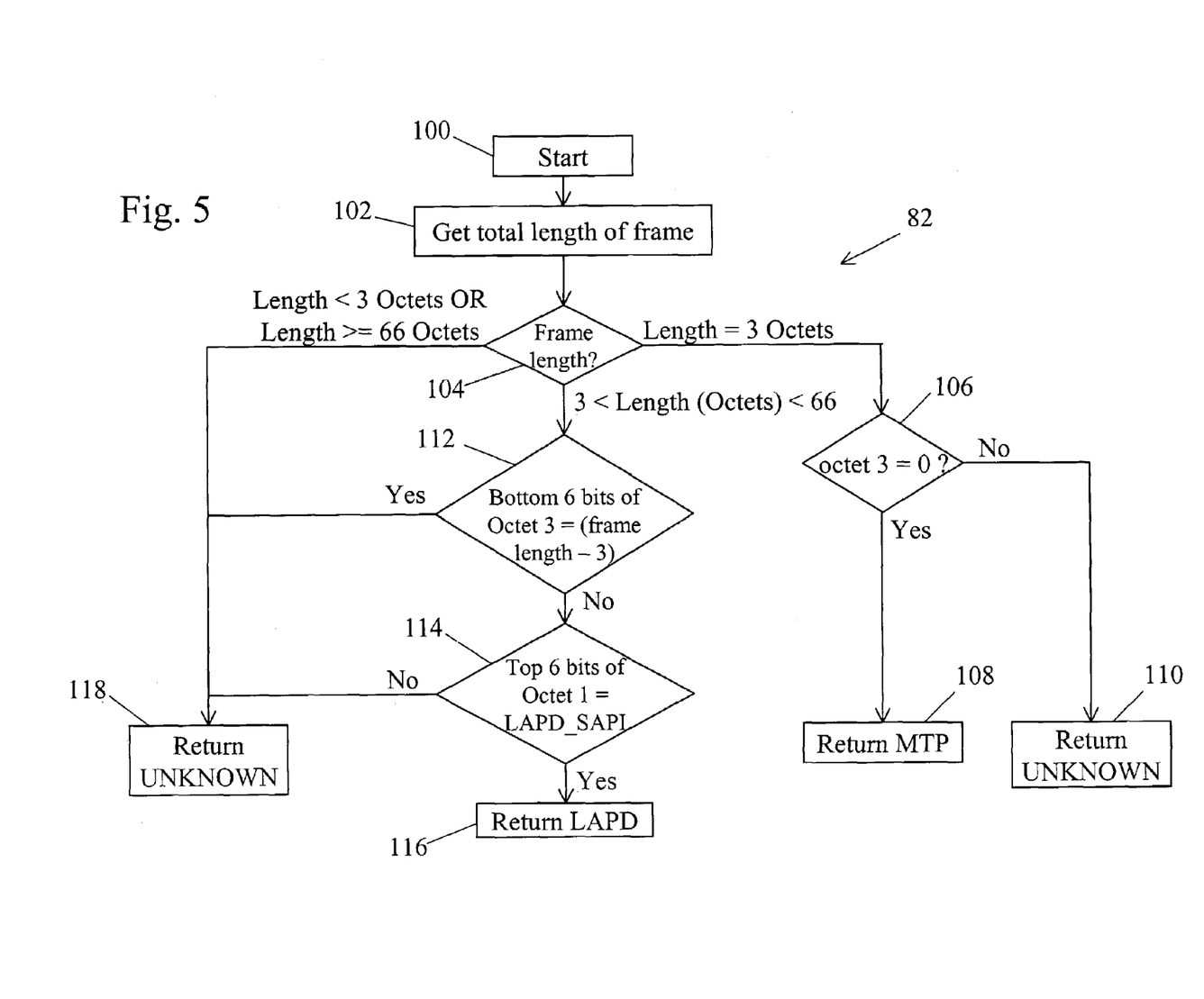
FIG. 5 is a flow chart of the protocol determining step in the flow chart of FIG. 4.

FIG. 5 shows a flowchart of subroutine 82 for determining the protocol of a frame. As shown in this Figure, the process starts (step 100) by determining the length of a frame (step 102). Depending on the frame length, different options are available (step 104). If the frame length is equal to three octets (bytes), the process flow then determines whether the third octet has a value of zero (step 106). As mentioned above, if the value of the third octet is zero, then the frame is an MTP FISU and a protocol identification of MTP is returned (step 108). If, however, the third octet has a different value (step 106), then a protocol identification of UNKNOWN is returned (step 110).

Returning to step 104, if the frame length is less than three octets or greater than or equal to sixty-six octets, then as mentioned above, the frame is ambiguous, so the UNKNOWN identification is returned (Step 118). If, however, the frame length is between three and sixty-six octets, then the protocol might be LAPD, but this needs to be checked further. Accordingly, the process flow proceeds to step 112, where the bottom six bits of the third octet are checked. If they are not equal to the frame length minus three, then, the frame is definitely not MTP, and the process flow moves on to step 114. On the other hand, if the bottom six bits of the third octet are equal to the frame length minus three, then the frame could be LAPD or MTP and the UNKNOWN identification is returned (Step 118). In step 114, the top six bits of the first octet are checked to see whether they have a SAPI value of LAPD_SAPI. If so, then a protocol identification of LAPD is returned (step 116); if not, then the UNKNOWN identification is returned (Step 118).

Thus, the subroutine 82 returns a protocol identification of LAPD, MTP or UNKNOWN. Returning now to FIG. 4, the returned protocol identification is considered in step 84. If it is UNKNOWN, then the process flow returns to step 72 to await receipt of a new frame. If, however, a protocol identification of LAPD or MTP is provided, then Channel Configuration Table 62 is accessed by the Protocol Auto-Discovery Module 63. The Channel Configuration Table 62 includes an LAPD Count entry, an MTP Count entry and Channel ID entry for each timeslot entry. The Count values are used to provide a confidence measure for a particular identification of a channel (Channel ID). Only one of the count entries can be greater than zero, with a threshold value being preset and a limit value being preset for each Count entry. The threshold value is used to provide a confidence measure that a sufficient number of frames have been identified as being of the same protocol that the channel can be identified as carrying that particular protocol (Channel ID). The limit value is preset so that the Count entry does not keep getting incremented infinitely. Initially, of course, the Channel ID entry is UNKNOWN, until the threshold value is reached by one of the Count entries, when the Channel ID is changed to that protocol.

Thus, if a protocol identification of LAPD is received from subroutine 82 for a channel (timeslot), the LAPD Count and the MTP Count for that channel are read (step 88). If the LAPD Count is below the preset limit (LIMIT) and the MTP Count entry is zero, then the LAPD Count is incremented by one. If, however, the MTP Count is greater than zero, then the MTP Count is decremented by one. Similarly, if a protocol identification of MTP is received from subroutine 82 for a channel (timeslot), the LAPD Count and the MTP Count for that channel are read (step 86). If the MTP Count is below the preset limit (LIMIT) and the LAPD Count entry is zero, then the MTP Count is incremented by one. If, however, the LAPD Count is greater than zero, then the LAPD Count is decremented by one.

Returning to step 74, if a valid checksum is not found at the end of the received new frame, indicating that it is not a valid HDLC frame, the Channel Configuration Table 62 is searched to determine whether there is a timeslot entry for that frame (step 94). If such a timeslot entry is not found (step 96), indicating that the channel was not considered to be a signalling link, then the process reverts to step 72 to receive the next frame. If, however, a timeslot entry is found (step 96) for that channel, indicating that the channel was considered to be a signalling link, then whichever of the Count entries for that timeslot is greater than zero is decremented by one (step 98).

From steps 86, 88 and 98, the process flow moves to step 90, where the LAPD Count and the MTP Count entries are considered. If either of the Count entries is equal to or above the threshold value (THRESHOLD), then the Channel ID is set (or maintained) to the appropriate identification. If however, either of the Count entries is below the threshold value and the Channel ID was previously set to that particular identification, then the Channel ID is set to UNKNOWN, indicating that the Count for that protocol has dropped below the threshold value, so that the identification of that channel is no longer sure (to the extent set by the threshold value).

The Channel ID for that timeslot is output (step 92) to the Channel Selector 65 (see FIG. 3), when it accesses the Channel Configuration Table 62, so that the Channel Selector 65 can switch messages on that Channel to the appropriate decoders 67, 69.

It will be apparent that the predetermined characteristics used to identify the protocols may be a single characteristic or a combination of characteristics sufficient to provide a definite identification. Of course not all messages in a particular protocol will necessarily include the characteristic, but, if a message doesn't include any of the characterisitics, then it is simply considered to be unidentified. As long as the characteristic tests are chosen so as to be relatively common, then enough of the messages on the particular link should be positively identified to enable the link to be identified as having the particular protocol.

It will also be appreciated that although only one particular embodiment of the invention has been described in detail, various modifications and improvements can be made by a person skilled in the art without departing from the scope of the present invention. For example, various embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. A method for determining a protocol of messages traversing a signalling link in a telecommunications network, comprising the steps of:
   predetermining at least one characteristic of a message in the protocol that can be used to distinguish that protocol from other protocols;
   monitoring at least one signalling link carrying messages between two nodes of the telecommunications network;
   determining whether the predetermined characteristic is present in the monitored message; and
   identifying the signalling link as carrying messages in the particular protocol if the predetermined characteristic is present in the monitored message.

2. A method of determining a protocol according to claim 1, wherein the predetermined characteristic includes a plurality of characteristics that can be used to distinguish the protocol to be identified.

3. A method of determining a protocol according to claim 1, wherein the monitored message is analysed to determine whether different predetermined characteristics for distinguishing different protocols is/are present in the monitored message.

4. A method of determining a protocol according to claim 1, wherein a plurality of messages on the signalling link are analysed to determine whether one or more of the predetermined characteristics is/are present in the monitored messages.

5. A method of determining a protocol according to claim 1, further comprising the step of storing a confidence measure providing an indication of the confidence of an identification of the signalling link as carrying messages in a particular protocol.

6. A method of determining a protocol according to claim 5, wherein the confidence measure includes a count of the number of messages on the signalling link that are identified as being in the particular protocol.

7. A method of determining a protocol according to claim 6, wherein the confidence measure is incremented each time a message on the signalling link is identified as being in the particular protocol and decremented each time a message on the signalling link is identified as being in a different protocol.

8. A method of determining a protocol according to claim 5, further including the step of determining whether the confidence measure has reached a predetermined threshold level and identifying the signalling link as carrying messages in the particular protocol only if the confidence measure has reached the predetermined threshold level.

9. A method of determining a protocol according to claim 1, wherein the protocol to be distinguished includes at least one of LAPD and MTP.

10. Apparatus for determining a protocol of messages traversing a signalling link in a telecommunications network, comprising:
    a memory for storing at least one predetermined characteristic of a message in the protocol that can be used to distinguish that protocol from other protocols;
    a monitoring means for monitoring at least one signalling link carrying messages between two nodes of the telecommunications network; and
    determination means coupled to the monitoring means and the memory for determining whether the predetermined characteristic is present in the monitored message and for identifying the signalling link as carrying messages in the particular protocol if the predetermined characteristic is present in the monitored message.

11. Apparatus for determining a protocol according to claim 10, wherein the determination means determines whether a monitored message includes different predetermined characteristics for distinguishing different protocols and identifies the signalling link as carrying messages in the particular protocol if the monitored message is determined as having the particular predetermined characteristic distinguishing that particular protocol.

12. Apparatus for determining a protocol according to claim 10, further comprising a confidence measure indicator coupled to the determination means for indicating the confidence of an identification of the signalling link as carrying messages in a particular protocol.

13. Apparatus for determining a protocol according to claim 12, wherein the confidence measure indicator is incremented each time a message on the signalling link is identified as being in the particular protocol and decremented each time a message on the signalling link is identified as being in a different protocol.

14. Apparatus for determining a protocol according to claim 12, wherein the determination means checks whether the confidence measure has reached a predetermined threshold level and identifies the signalling link as carrying messages in the particular protocol only if the confidence measure indicator has reached the predetermined threshold level.

15. Apparatus for determining a protocol according to claim 10, wherein the protocol to be distinguished includes at least one of LAPD and MTP.

* * * * *